Patented Feb. 27, 1923.

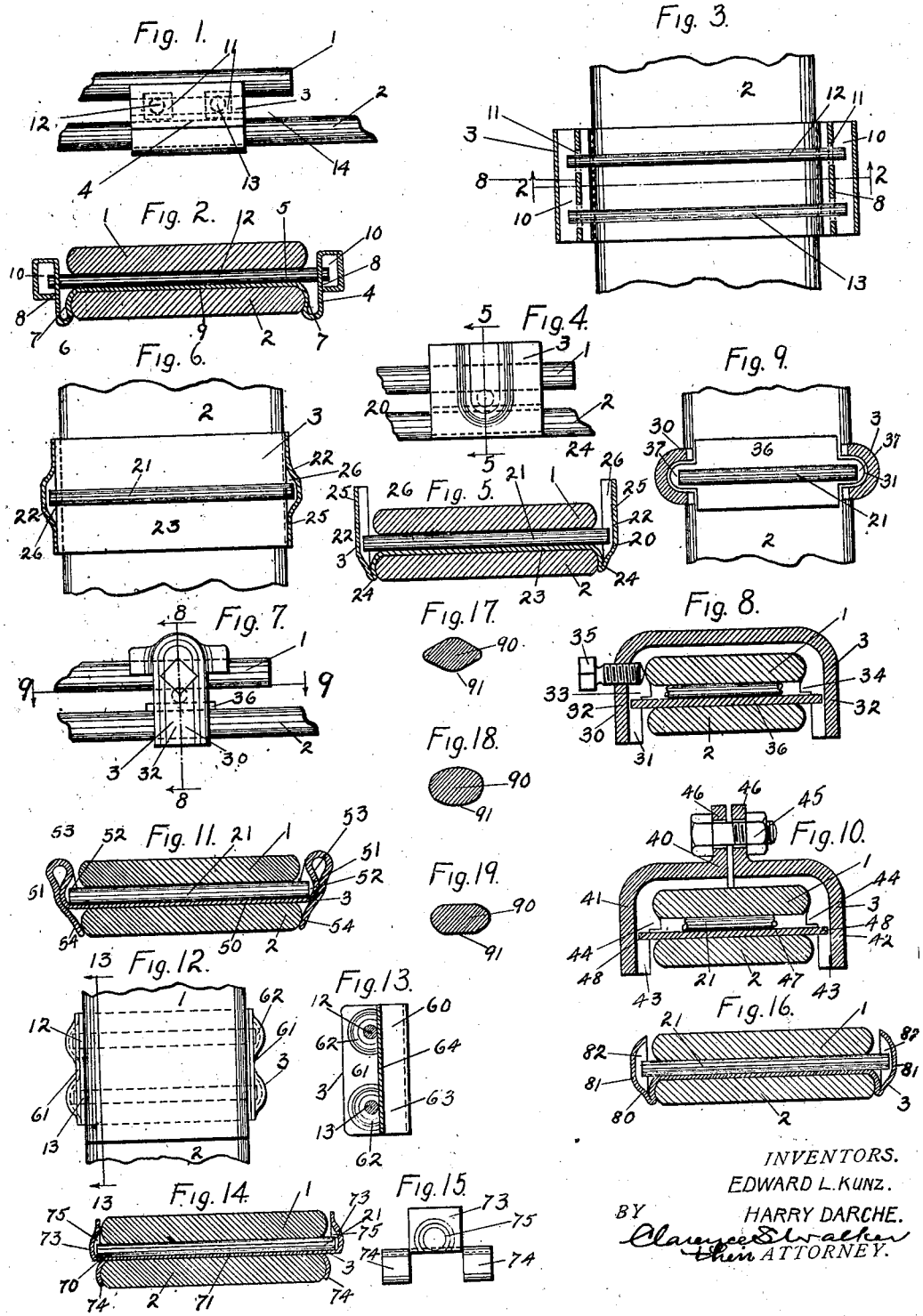

1,446,908

UNITED STATES PATENT OFFICE.

EDWARD L. KUNZ AND HARRY DARCHE, OF BUFFALO, NEW YORK.

LEAF SPRING.

Application filed January 12, 1922. Serial No. 528,828.

*To all whom it may concern:*

Be it known that we, EDWARD L. KUNZ and HARRY DARCHE, citizens of the United States, residing at Buffalo, in the county of Erie and State of New York, have invented certain new and useful Improvements in Leaf Springs, of which the following is a specification.

This invention relates to leaf springs for automobiles and other vehicles and more particularly to means adapted to be inserted between the leaves to take up friction and increase the easy riding qualities of the vehicle by increasing the amount of flexion of the spring leaves.

Leaf springs are made without any separating elements between the leaves so that each leaf rests directly upon the one below. When the spring flexes under a load these leaves tend to shift longitudinally on each other and since this movement is resisted by friction between the leaves the spring cannot flex quickly to resist and absorb all shocks. By providing anti-friction means between the leaves the ease of relative movement between the leaves is increased.

While the employment of rollers or other positive anti-friction means has been suggested previously it has been found that their use has had a weakening effect upon the longer of the two separated leaves due to the friction of the roller upon it. Furthermore practically all of the devices known prior to this invention necessitated either the use of a particular form of leaf or else the complete disassembly of the spring before the device could be installed.

One object of this invention is to provide anti-friction means which will not injure or weaken the spring leaves and which can be quickly and securely installed without disassembly of the spring.

Another object is the provision of a unitary roller clip which will hold the anti-friction roller in position between the leaves and at the same time provide a surface on which the roller will function without injuring the longer of the separated leaves.

A further object is the provision of a clip adjustable to accommodate springs of varying width.

Other objects will appear from an examination of the following description taken in connection with the accompanying drawing which forms a part thereof and in which Fig. 1 is an end view and Fig. 2 a transverse cross sectional view taken on the line 2—2 of Fig. 3 of a portion of a leaf spring equipped with one embodiment of this invention;

Fig. 3 is a plan view of such embodiment partly in section resting on the lower leaf;

Fig. 4 is an end view and Fig. 5 a cross sectional view taken on the line 5—5 of Fig. 4 of a portion of a leaf spring equipped with a second embodiment of this invention;

Fig. 6 is a plan view of a spring leaf on which rests the embodiment shown in Figs. 4 and 5;

Fig. 7 is a side elevation of two leaves of a leaf spring equipped with a third embodiment of this invention;

Fig. 8 is a transverse section and Fig. 9 a sectional plan view taken on the lines 8—8 and 9—9 respectively of Fig. 7;

Fig. 10 is a transverse view of a portion of a leaf spring equipped with a fourth embodiment of this invention;

Fig. 11 is a transverse sectional view of a portion of a leaf spring equipped with a fifth embodiment of this invention;

Fig. 12 is a plan view of a portion of a leaf spring equipped with a sixth embodiment of this invention;

Fig. 13 is a cross sectional view taken on the line 13—13 of Fig. 12 of the embodiment of this invention there shown;

Fig. 14 is a transverse sectional view of a portion of a leaf spring equipped with a seventh embodiment of this invention;

Fig. 15 is an end view of the embodiment shown in Fig. 14;

Fig. 16 is a transverse sectional view of a portion of a leaf spring equipped with an eighth embodiment of this invention; and Figs. 17, 18 and 19 are cross sectional views of rollers that might be used in place of the cylindrical rollers shown in the other figures of the drawing.

Referring to the drawings the reference numerals 1 and 2 are used to designate respectively the upper and lower leaves of a leaf spring separated by a roller spring clip 3 made in accordance with this invention. Various embodiments of this clip are disclosed in the drawings but it will be observed that in each instance they comprise a cage 4 by which anti-friction means 5 are held in position between the spring leaves and out of direct contact with the longer spring 2. In the drawings the longer spring, according to the practice followed in certain vehicles such as for instance the Ford automobile, is the lower spring. This is not, however, the universal practice, many springs being formed in which the upper leaves are longer than the lower. Nevertheless it will be noted that this variance in spring construction does not affect in any way the functioning of this invention, the cage being secured to either the longer or shorter leaf depending upon the particular embodiment employed.

In Figs. 1, 2 and 3 the cage 4 consists of a strip of hardened metal 6 bent at each end to form the leaf engaging portions 7, then bent back on itself to form the end cheeks 8 substantially perpendicular to and spaced away from the central portion 9 and finally bent outwardly to form the open ended pockets 10 here shown as rectangular in cross section.

Apertures 11 are cut in the parallel cheeks 8 to receive the anti-friction means 5 consisting in this embodiment of rollers 12 and 13 which extend through the apertures 11 into the pockets 10. The roller 13 which, as shown in Fig. 1, is nearer the end of the leaf 1 is made slightly larger than the roller 12. This is done because the spring leaves are usually clamped together at the center and consequently have a tendency when separated to flare toward the opening 14. The difference in diameter of the rollers 12 and 13 is not easily noticed so that it has been found advantageous to make the roller 13 easily distinguishable from the roller 12 by painting it a different color. The apertures 11 are larger than the rollers 12 and 13 so that while the rollers are within the edges of the apertures they are not held against any translatory movement that might be given as a result of the flexing of the leaves.

The portions 7 are curved to follow the curved sides of the leaf 2 and hence substantially enclose them, eliminating any tendency of the clip to separate from the leaf on which it is mounted when the leaves are spaced further apart by reason of a shock. This is of particular importance when the longer leaf, on which the clip is mounted, is the upper one in the case of springs of the type mentioned above as formed reversely to the type of spring shown in the drawings.

The clip 3 shown in Figs. 4, 5 and 6 comprises a cage 20 resting on the longer leaf 2 and a roller 21. The cage 20 consists of cheeks 22 integral with and comprising the ends of a plate 23 which lies across the upper face of the leaf 2. The cheeks 22 are formed by bending the ends of the plate 23 first at right angles in one direction and then back in the opposite direction thus providing double ply lower sections 24 and single ply upper sections 25. Centrally depressed in the upper sections 25 are vertical grooves 26 into which extend the ends of the roller 21 resting on the plate 23.

The lower sections 24 of the plates 22, when the clip is installed, clamp both sides of the leaf 2 and as shown particularly in Figs. 5 and 6 prevent any shifting of the clip relative to the leaves. The normal pressure exerted by the upper leaf upon the lower leaf will prevent any longitudinal shifting of the roller clip. Thus the clip remains in the desired position without requiring the use of a set screw or other positive securing means.

The roller clip 3 of the embodiment shown in Figs. 7, 8 and 9 comprises a cage 30 having a longitudinal central groove 31 therein. Since the cage 30 extends across the outer side of the leaf it is mounted upon the shorter leaf rather than upon the longer leaf 2 as in the roller clip of the embodiments previously described. The cage is provided with end cheeks 32 which extend downwardly at the sides of both leaves 1 and 2 and into the grooves in the cheeks 32 project the ends of the single roller 21. From the cheeks 32 at each side of the groove 31 project fingers 33 and 34 which extend under the upper leaf 1 as shown in Figs. 8 and 9 and hold the cage in position on the leaf. In addition a set screw 35 is provided which is threaded through one cheek 32 and bears against the side of the leaf 1 and further holds the clip in place. Resting on the lower leaf 2 under the roller 21 is a plate 36 having tongues 37 at each end, which tongues project into the grooves 31 as shown particularly in Fig. 9. The roller 21 is thus kept out of contact with the lower leaf by the plate 36 so that the action of the roller does not wear the leaf 20. While it is obviously necessary to slide the cage 30 onto the leaf 21 it has been found that the plate 36 under the pressure of the leaf 1 and the roller 21 will bear against the leaf 2 so as to prevent any slipping of the clip after assembly, even if the set screw 35 is omitted.

In order to apply a roller clip to leaves of different width and to clamp the cage to the sides of the shorter leaf a clip embodying a two part cage may be employed. This form of clip is shown in Fig. 10 and is constructed along the general lines of the embodiment disclosed in the Figs. 7, 8 and 9. The cage 40 in this embodiment is made up of two similar parts 41, 42, each of which has a central groove 43 and fingers 44 which project below the upper leaf 1. The parts are united by a nut and bolt assembly 45 through flanges 46 projecting from the adjacent ends of the parts. By tightening the assembly 45 the parts 41 and 42 are clamped lightly against the sides of the leaf 1 so that the cage 40 cannot shift its position. Upon the leaf 2 is placed a plate 47 on which lies the roller 21. The tongues 48 of the plate 47 extend into grooves 43 of the cage while the ends of the roller 21 lie in the grooves 45 of the end cheeks of the parts 41 and 42 between the fingers 44. This type of clip is applied to the leaf 2 without disassembling the spring and is held in place by the nut and bolt 45 as well as by the pressure of the upper leaf upon the roller 24 and plate 47.

Other forms of roller spring clips may be provided in which a single roller is more or less permanently mounted in the cage so that the clip may be assembled as a unit. Figs. 11 to 16 inclusive show such embodiments of this invention.

In Fig. 11 the ends of the plate 50 are bent first at right angles and then back in the opposite direction to provide the end cheeks, somewhat similar to the Figs. 4, 5 and 6 embodiment but in this instance the roller 21 is held by the double ply portion while the single ply portion of the cheeks engages the sides of the leaf 2. Each double ply portion 51 is provided with a pocket or depression 52 in the wall 53 for the reception of the ends of the roller 21.

Figs. 12 and 13 disclose an embodiment similar in general construction to that of Figs. 1, 2 and 3. The end cheeks 61 of the cage 60, however, are not provided with exterior pockets nor are there apertures into which the rollers 12 and 13 will extend. In place thereof depressions 62 are formed in the cheeks 61 which will receive the ends of the rollers. The clip is held in place on the leaf 2 by the portions 63 which are formed to engage the sides of the leaf and hold the central portion of the plate 64 in place.

The clip 3 of the embodiment disclosed in Figs. 14 and 15 consists, as in the other embodiments, of a cage, here designated as 70, and a roller 21. The cage comprises a hardened plate 71 having in each end two parallel slots 72. The portion 73 defined by the slots is bent at right angles to the main body of the plate in one direction while the outer portions 74 are bent at right angles to the main body of the plate in the opposite direction. In the inner faces of the portions 73 which constitute the end cheeks are formed depressions 75 which receive the ends of the roller 21. The portions 74 are bent to engage closely the edges of the leaf 2 and thus hold the clip in place.

In Fig. 16 the cage 80 of the clip 3 is very similar to the cage 20 of the Figs. 4, 5 and 6 embodiment except that the ends of the sides 81 are shaped to provide depressions 82 instead of grooves. The roller 21 lies on the central portion of the plate 82 from which the cage is formed and extends into the depressions 82.

Each embodiment of roller spring clip shown and described is installed without disassembling the spring by simply separating the leaves with a screw driver or chisel. Each clip carried by the longer leaves (Figs. 1, 2, 3, 4, 5, 6, 11, 12, 13, 14, 15, 16) is then placed thereupon either above the position it will occupy when fully installed, or else with one side plate in contact with the side of the leaf and the other resting on the inner face of the leaf near the other side. The separating means is now withdrawn so that the leaves will spring together, snapping the clip into place. When a clip of the type shown in Figs. 7, 8 and 9 is installed the plate 36 and roller 21 are placed against the longer leaf and held there by the engagement of the depressions 31 in the ends 32 with the ends of the roller and the tongues 37 of the plate. The entire clip is then slipped over the end of the shorter leaf 1, the roller and plate being inserted between the leaves and the fingers 33 and 34 guiding the cage. When the desired position is reached the set screw 35 if used is tightened.

The clip embodiment shown in Fig. 10 is installed in a slightly different manner it being, however, only necessary to separate the leaves. The plate 47 and roller 21 are put in position between the leaves and are held there by the parts 41, 42 which are applied to the shorter leaves and clamped in place by the nut and bolt 45.

A consideration of the foregoing description and of the drawings will disclose the fact that certain features are common to all the embodiments shown. Among these common features are the following (1) the cages extend completely across one face of one leaf and partly overhang the opposite face so that the cage can only be removed from the partly enclosed leaf by shifting it longitudinally of the leaf to one end or by expanding the cage transversely of the leaf, (2) the ends of the cages extend at each side of each leaf, (3) the clip rollers are prevented from translatory shifting between the leaves by depressions formed in the inner faces of each end of the cages into which the ends of the rollers extend, (4) the face of the longer leaf adjacent the shorter leaf is protected from the wear of the roller by means of a hardened plate, (5) the clip may be inserted by separating the leaves without disassembling them.

In addition to the rolling motion which results from the use of the cylindrical roller 21 it may be desired to use a roller having a non-circular cross section to permit a rocking or wearing of the spring under certain shocks. This may be obtained by using rollers having for example a cross section such as is shown in Figs. 17, 18 and 19 in which the roller 90 will pivot on the lower edge 91 and will have an oscillatory rather than a translatory motion and thus the spring will be even more responsive to a slight shock.

The various embodiments of our roller clip all provide means for protecting the longer leaf against wear by the roller but plates protecting the shorter leaf may also be supplied if desired by employing plates similar to 36 having tongues projecting into the grooves or pockets.

While certain embodiments of this invention have been shown and described we are not to be limited thereby since others may be made without departing from the spirit and scope of our invention as set forth in the following claims.

Having thus described our invention that which we claim as new and for which we desire protection of Letters Patent of the United States is the following:

1. A roller spring clip adapted to separate the adjacent leaves of a spring comprising a cage substantially enclosing and frictionally engaging the sides of one leaf and having a plate engaging upon and extending completely across the face of one leaf and cheeks at the ends of said plate and the sides of said leaves, in combination with a roller contacting said plate and guided and confined at its ends by said cheeks, the latter being formed to permit a prescribed measure of play of said roller in the longitudinal direction of said spring.

2. A roller spring clip adapted to separate the adjacent leaves of a spring comprising a cage substantially enclosing and frictionally engaging the sides of one leaf and having a plate engaging upon and extending completely across the face of said leaf and cheeks integral with said plate at the ends thereof and at the sides of said leaves, in combination with a roller contacting said plate and guided and confined at its ends by said cheeks, the latter being formed to permit a prescribed measure of play of said roller in the longitudinal direction of said spring.

3. A roller spring clip adapted to separate the adjacent leaves of a spring comprising a cage having a plate engaging upon and extending completely across the face of one leaf and having portions at the ends of one leaf and having with said plate bent angularly and integral with said plate bent angularly into two-ply formation and fashioned to provide end checks at the sides of the spring and parts combined therewith which frictionally engage the sides of said leaf in combination with a roller contacting said plate and guided and confined at its ends by said cheeks, the latter being formed to permit a prescribed measure of play of said roller in the longitudinal direction of said spring.

4. A roller spring clip adapted to separate the adjacent leaves of a spring comprising a cage having a plate engaging upon and extending completely across the face of one leaf and having portions at the ends of and integral with said plate bent downward to engage frictionally over the sides of said leaf and then bent upward to provide end cheeks at the sides of said spring in combination with a roller contacting said plate and guided and confined at its ends by said cheeks, the latter being formed to permit a prescribed measure of play of said roller in the longitudinal direction of said spring.

5. A roller spring clip adapted to separate the adjacent leaves of a spring comprising a cage having a plate engaging upon and extending completely across the face of one leaf and having portions at the ends of and integral with said plate bent downward to engage frictionally over the sides of said leaf and then bent upward to provide end cheeks at the sides of said spring and again bent downward and angularly to bear against said cheeks and provide pockets, said cheeks having openings, in combination with a roller contacting said plate and having its end portions extended through said openings and into said pockets, said openings permitting a prescribed measure of play of said roller in the longitudinal direction of said spring.

In testimony whereof we affix our signatures.

EDWARD L. KUNZ.
HARRY DARCHE.